United States Patent [19]
Makino

[11] Patent Number: 5,153,767
[45] Date of Patent: Oct. 6, 1992

[54] F-THETA LENS SYSTEM AND LASER SCANNER USING THE SAME

[75] Inventor: Jun Makino, Yokohama, Japan

[73] Assignee: Canon Kabushiki Kaisha, Tokyo, Japan

[21] Appl. No.: 660,883

[22] Filed: Feb. 26, 1991

[30] Foreign Application Priority Data

Mar. 1, 1990 [JP] Japan .................................. 2-50590

[51] Int. Cl.⁵ .......................... G02B 26/08; G02B 3/00
[52] U.S. Cl. .................................... 359/206; 359/215; 359/662
[58] Field of Search ................ 350/6.1–6.91, 350/432–433, 463, 480; 359/196–226, 662; 250/234–236

[56] References Cited

U.S. PATENT DOCUMENTS

| | | | |
|---|---|---|---|
| 4,707,085 | 11/1987 | Takanashi et al. | 350/480 |
| 4,818,046 | 4/1989 | Kondo | 350/6.8 |
| 4,846,539 | 7/1989 | Takanashi et al. | 350/6.8 |
| 4,953,926 | 9/1990 | Morimoto | 350/6.8 |
| 4,955,682 | 11/1990 | Yamaguchi et al. | 350/6.8 |
| 5,015,050 | 5/1991 | Itabashi | 350/433 |

Primary Examiner—Bruce Y. Arnold
Assistant Examiner—Thong Nguyen
Attorney, Agent, or Firm—Fitzpatrick, Cella, Harper & Scinto

[57] ABSTRACT

An $f-\theta$ lens system for directing a light beam deflected by a light deflector to a surface to be scanned is disclosed. The $f-\theta$ lens system include a first lens system arranged to face the light deflector and having a positive refractive power in a scan plane and a second lens system arranged to face the surface to be scanned and having a positive refractive power. A focal length $f_M$ of the overall system of the $f-\theta$ lens system in the main scan plane and a focal length $f_S$ of the overall system thereof in the sub-scan plane are different from each other. Further, a condition of $D_2/f_M \geq 0.1$ is satisfied, where $D_2$ is a distance between the first lens system and the second lens system.

27 Claims, 9 Drawing Sheets

F-θ LENS SYSTEM AND LASER SCANNER USING THE SAME

BACKGROUND OF THE INVENTION

1. Field of the Invention

The present invention relates to an f−θ lens system and a laser scanner using the same, and more particularly to an f−θ lens system having a plane skew correction function for a light deflection plane in deflecting a laser beam, which is useful in forming an image such as a laser beam printer (LBP) which effectively focuses a laser spot on a surface to be scanned.

2. Related Background Art

In a prior art laser scanner used for forming an image such as a digital copier or an LBP, a laser beam emitted from a laser light source such as a semiconductor laser is collimated by a collimator lens. The laser beam is then passed through a beam reshaping optical system or a cylindrical lens as required, and it is then directed to a light deflector such as a polygon mirror which rotates at a constant speed. The laser beam reflected and deflected by the deflection plane of the light deflector is focused onto a surface to be scanned such as a photoconductor drum by the f−θ lens system to form a laser spot of a predetermined shape, by which the scan plane is scanned.

The f−θ lens system used in such a laser scanner has an optical function of focusing the laser beam onto the scan surface and maintaining a constant scanning speed of the laser spot along a main scan direction. In order to correct the ununiformity of scan lines due to a plane skew of the deflection plane of the light deflector, an anamorphic optical system is used in many cases to make the deflection plane and the scan plane conjugate.

In forming an image in the prior art LBP, a diameter of the laser spot on the scan surface may be in the order of 100 μm, and an effective F member $F_{NO}$ of the f−θ lens system which uses the semiconductor laser is approximately 60~100. As a result, a depth of focal point on the scan surface is deep and the laser spot diameter is relatively well maintained in the range from a center to a periphery of the scan plane.

In a recent LBP, in order to form a higher resolution image, a laser scanner having an effective F number $F_{NO}$ of the f−θ lens system of less than 40 and the laser spot diameter on the scan surface of less than 50 μm has been proposed.

In such an f−θ lens system having the small effective F number $F_{NO}$, if an anamorphic optical system is used as one of lenses to provide the plane skew correction function of the deflection plane of the light deflector, the shape of the laser beam is not circular or oval at the periphery of the scan surface but is triangular thereat. This degrades the image quality at the periphery.

U.S. Pat. No. 4,674,825 assigned to the assignee of the present invention discloses a laser scanner which uses an f−θ lens system comprising three lenses in total and which keeps the shape of the laser spot well even at the periphery of the scan surface while providing the plane skew correction function of the light deflection plane.

It is an object of the present invention to provide an f−θ lens system which is an improvement over the f−θ lens disclosed in the U.S. Pat. No. 4,674,825 and which comprises two lenses in total to simplify the overall lens system, keeps the laser spot diameter well even at the periphery of the scan surface, has the plane skew correction function of the deflection plane of the light deflector, has a small eccentricity tolerance in assembling, and is suitable to an image forming apparatus such as an LBP, as well as a laser scanner using such an f−θ lens system.

The f−θ lens system of the present invention directs a light beam from a light source onto a scan surface through a light deflector to scan the light beam. The f−θ lens system comprises two lenses, a first lens having a positive refractive power in a main scan plane and a second lens having a positive refractive power in the main scan plane, arranged in this order as viewed from the light deflector, and a focal length $f_M$ of the overall system in the main scan plane and a focal length $f_S$ of the overall system in a sub-scan plane are different from each other, and the following condition is met:

$$D_2/f_M \geq 0.1$$

where $D_2$ is a distance between the lenses.

In the laser scanner of the present invention, the laser beam from the laser light source is linearly focused to the vicinity of the deflection plane of the light deflector by the focusing system, and the laser beam deflected by the light deflector is directed to the scan surface by the f−θ lens to scan the laser beam.

The f−θ lens system comprises two lenses, the first lens having the positive refractive power in the main scan plane and the second lens having the positive refractive power in the main scan plane, arranged in this order as viewed from the light deflector. The focal length $f_M$ of the overall system in the main scan plane and the focal length $f_S$ of the overall system in the sub-scan plane are different from each other, and the following condition is met:

$$D/\text{hd } 2/f_M \geq 0.1$$

where $D_2$ is the distance between the lenses.

BRIEF DESCRIPTION OF THE DRAWINGS

FIGS. 3A to 6E illustrate numerical examples 1 to 4 of an f−θ lens system of the present invention, in which (A) shows a lens sectional view taken along a main scan direction, (B) shows a lens sectional view taken along a sub-scan direction, (C) illustrates curvature of an image plane on a scan plane, (D) shows an f−θ characteristic, and (E) shows an intensity distribution of a laser spot on the scan surface.

DETAILED DESCRIPTION OF THE PREFERRED EMBODIMENTS

Figure 1:
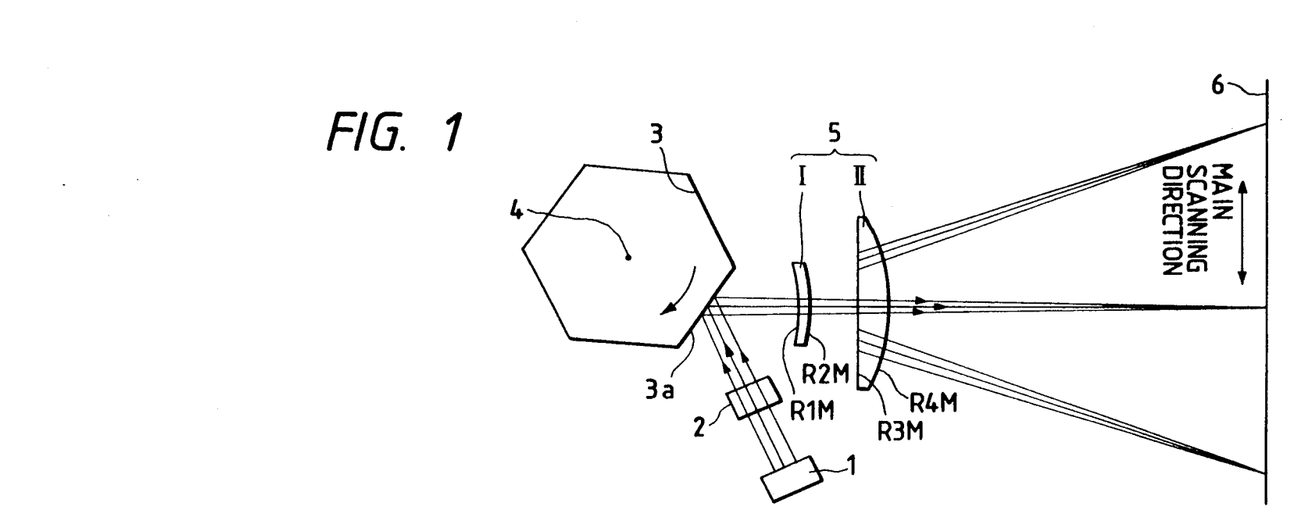
FIGS. 1 and 2 show sectional views, taken along a main scan direction and a sub-scan direction, of a laser scanner of the present invention.
Figure 2:
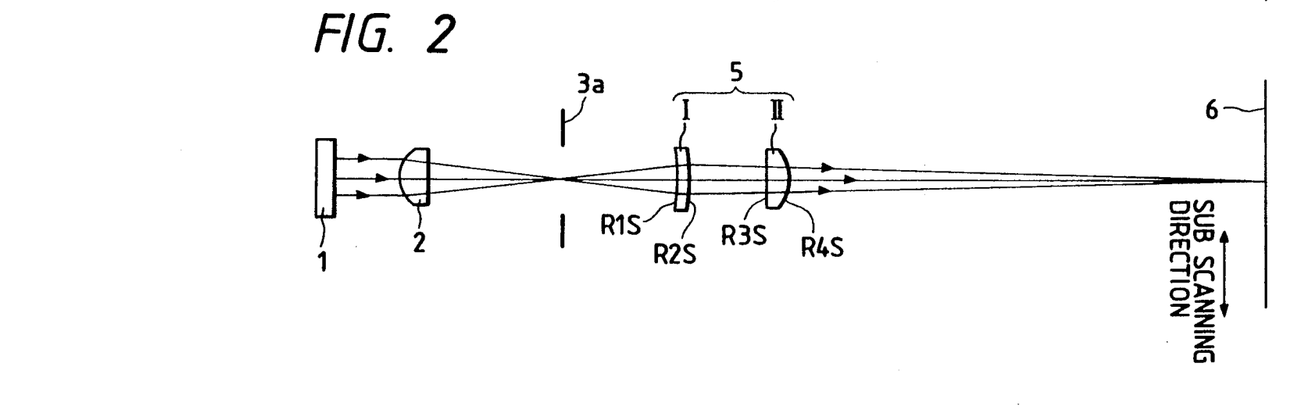
Figure 3A:
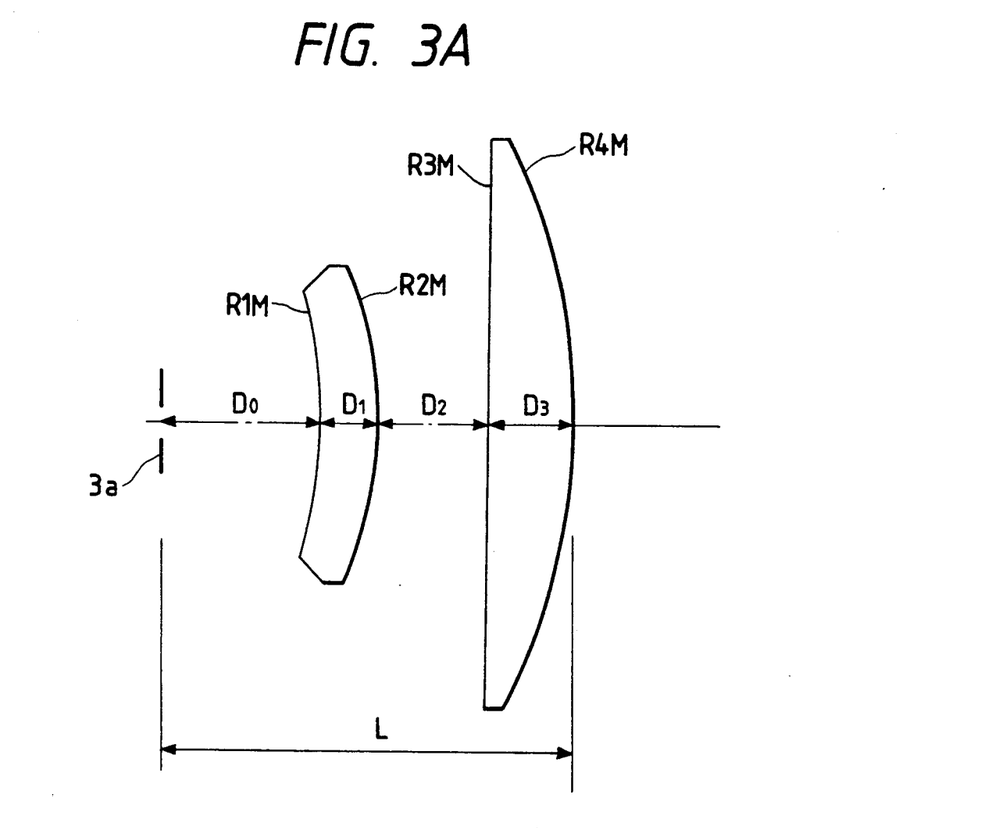
Figure 3B:
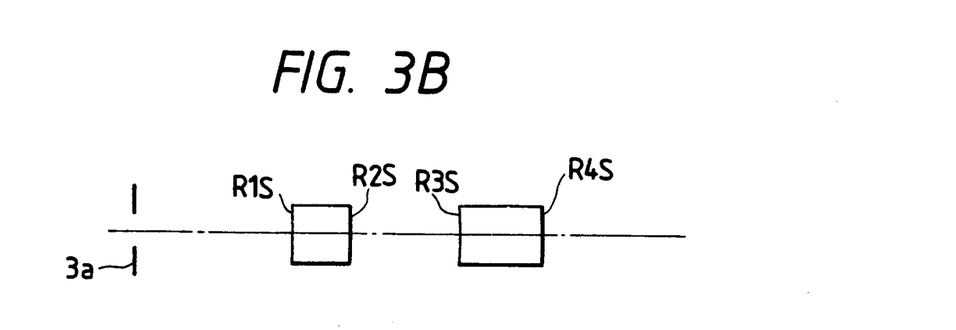
Figures 3C, 3D:
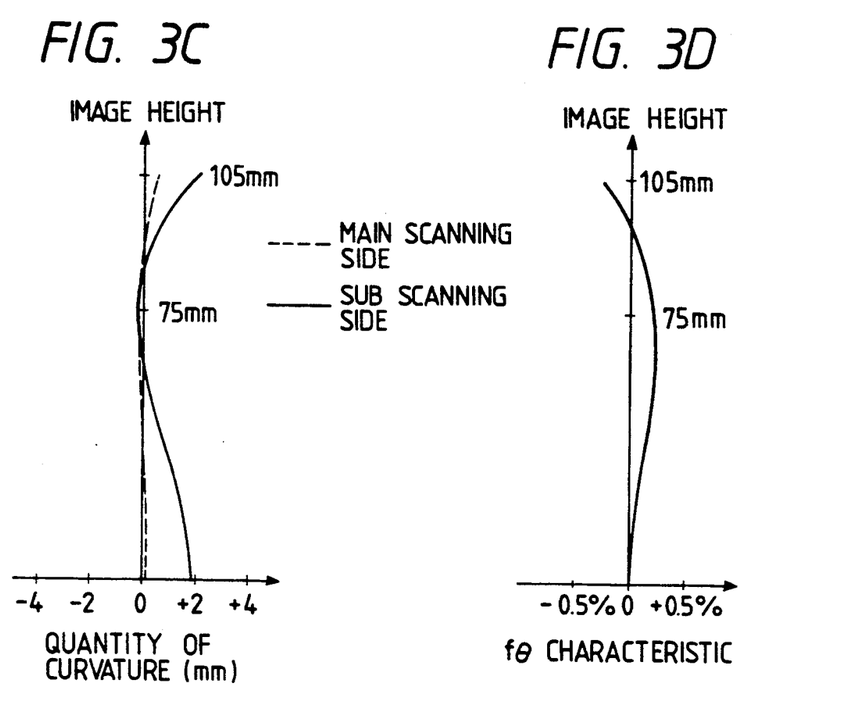
Figure 3E:
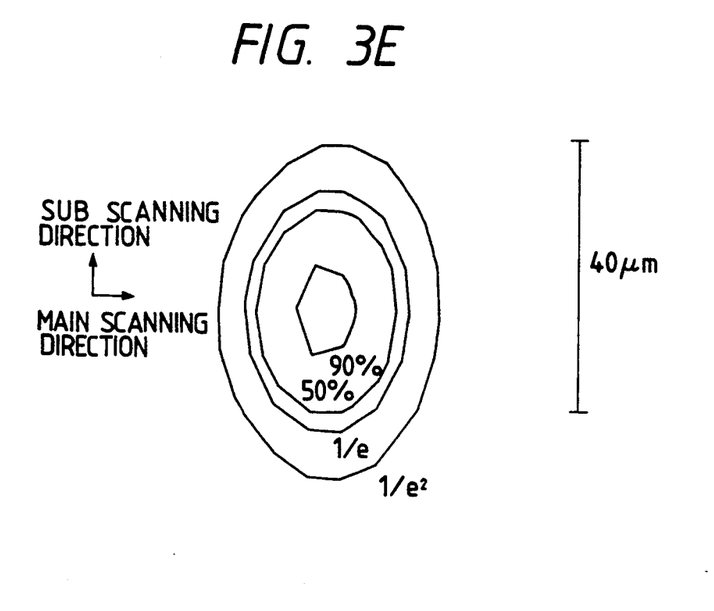
Figure 4A:
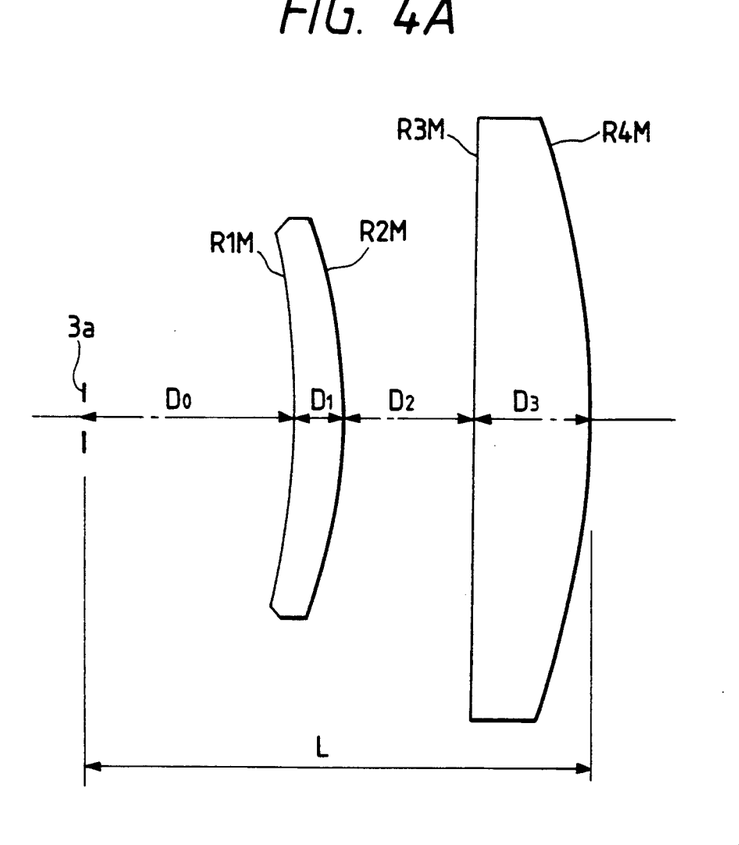
Figure 4B:
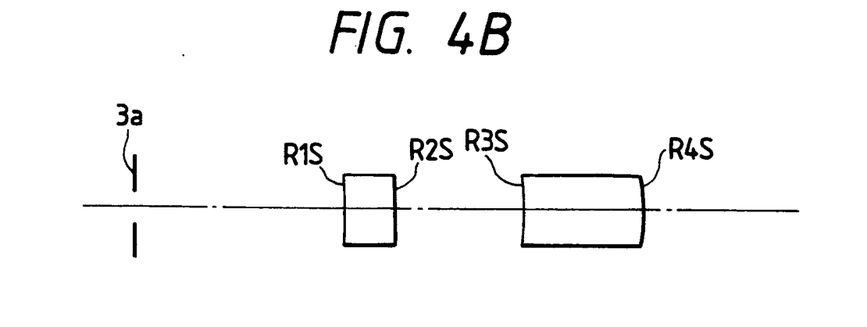
Figures 4C, 4D:
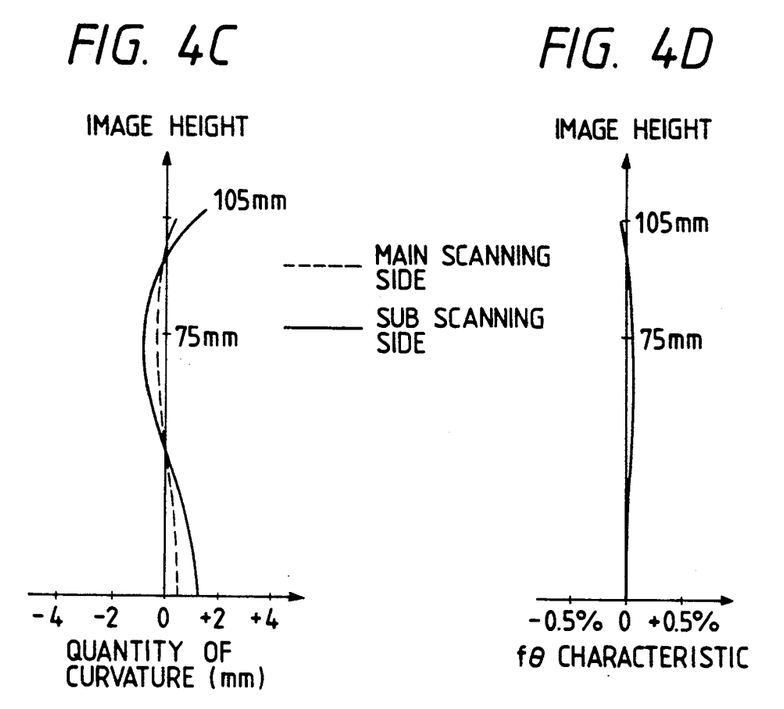
Figure 4E:
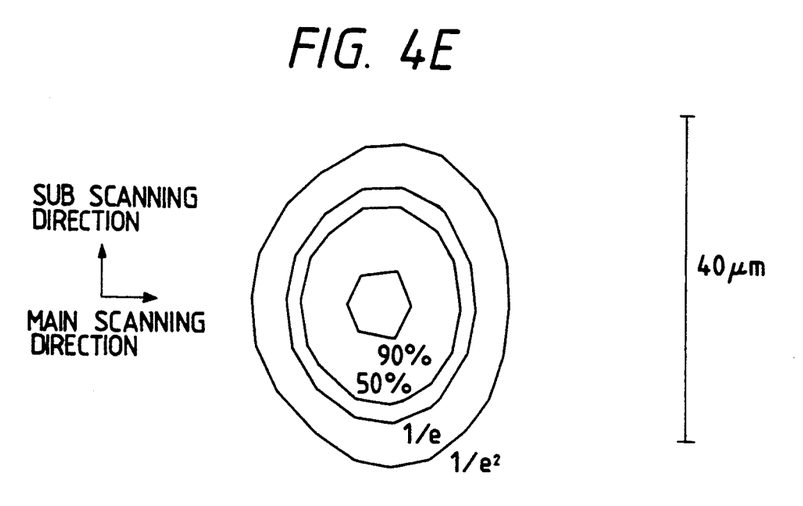
Figure 5A:
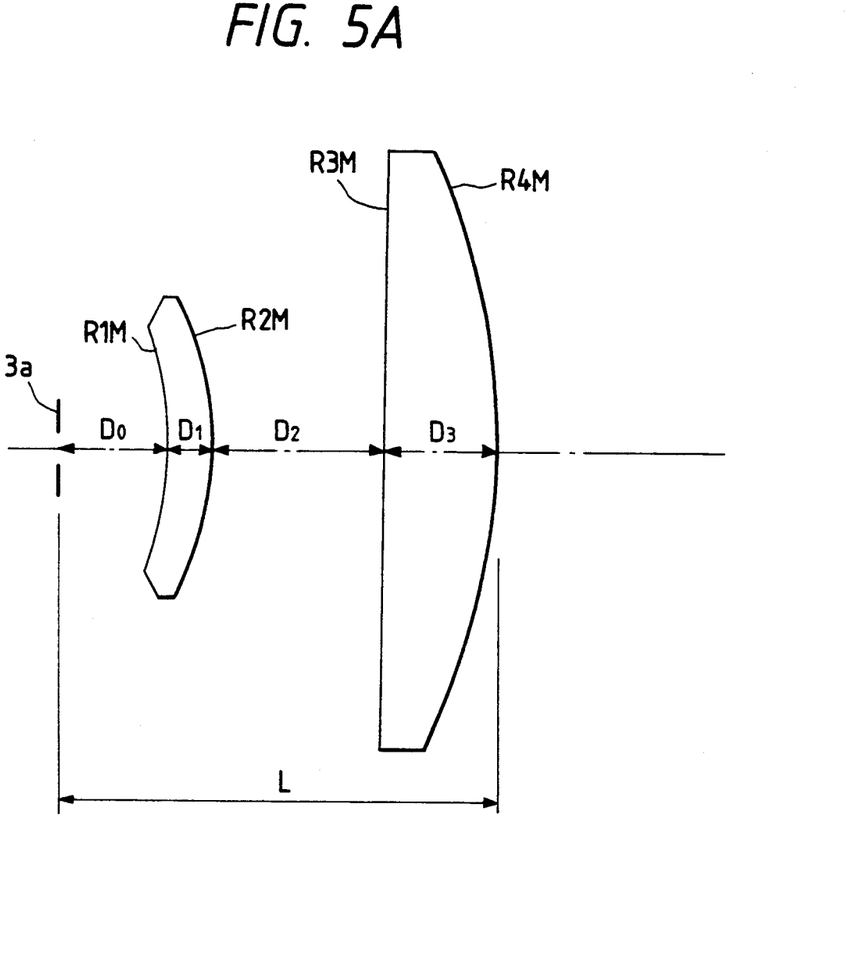
Figure 5B:
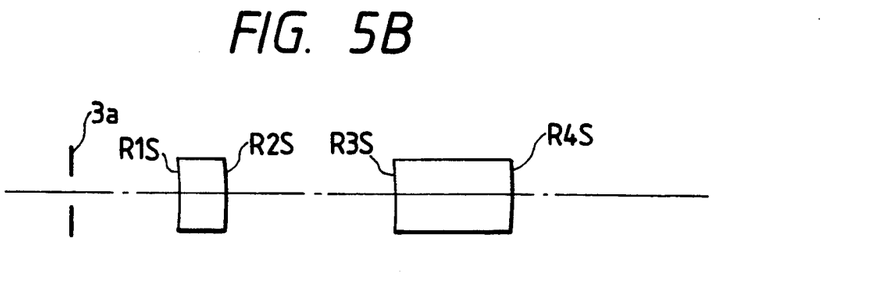
Figures 5C, 5D:
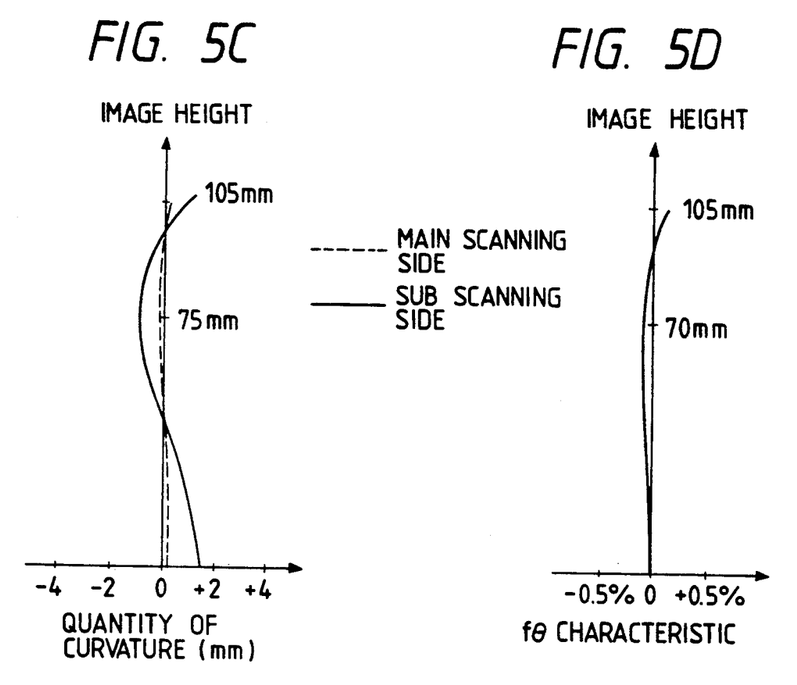
Figure 5E:
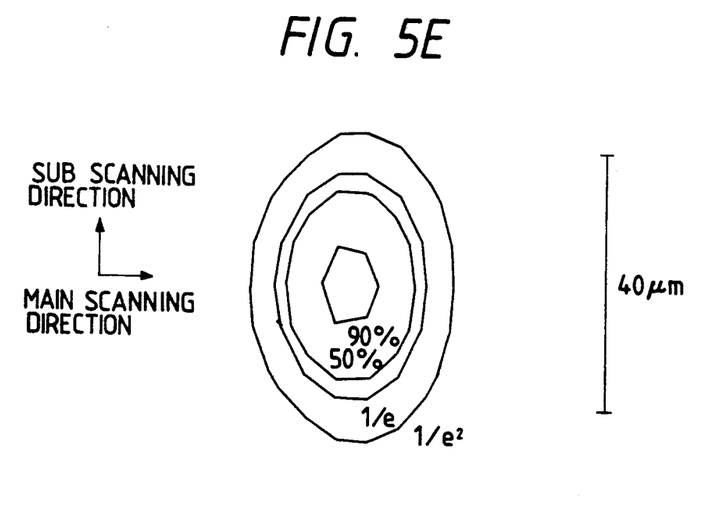
Figure 6A:
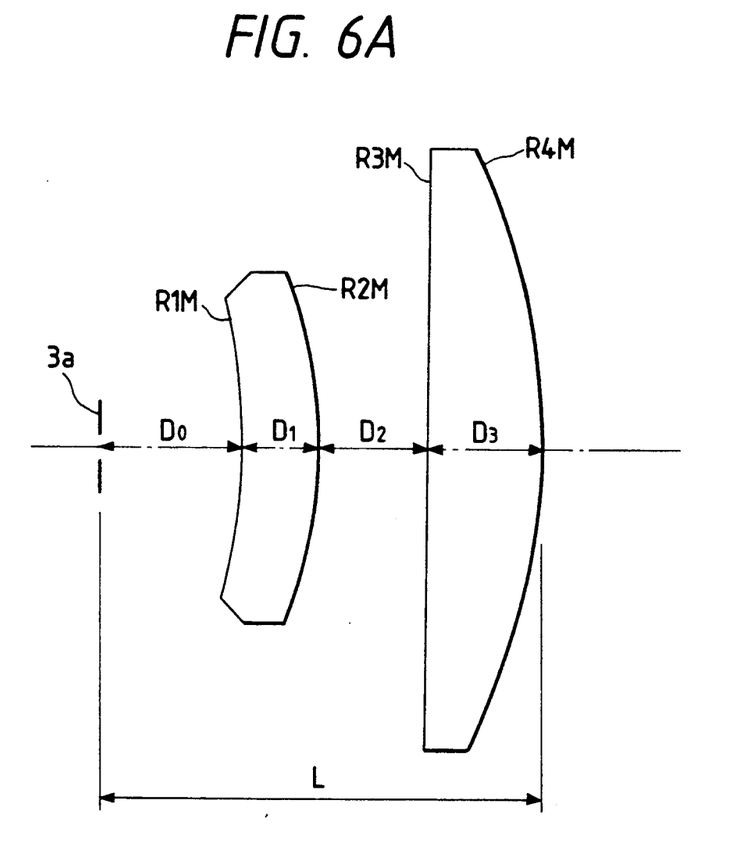
Figure 6B:
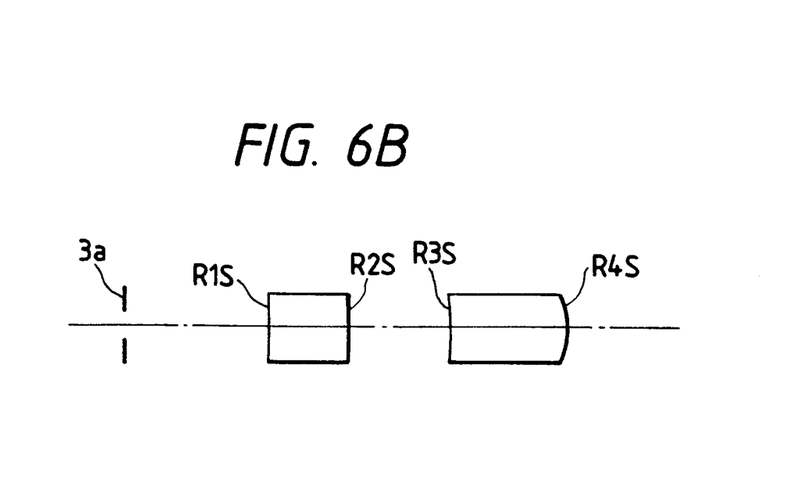
Figure 6C:
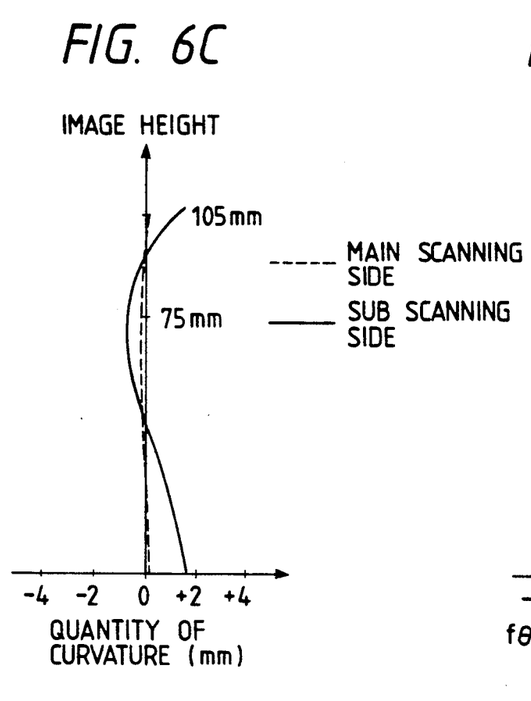
Figure 6D:
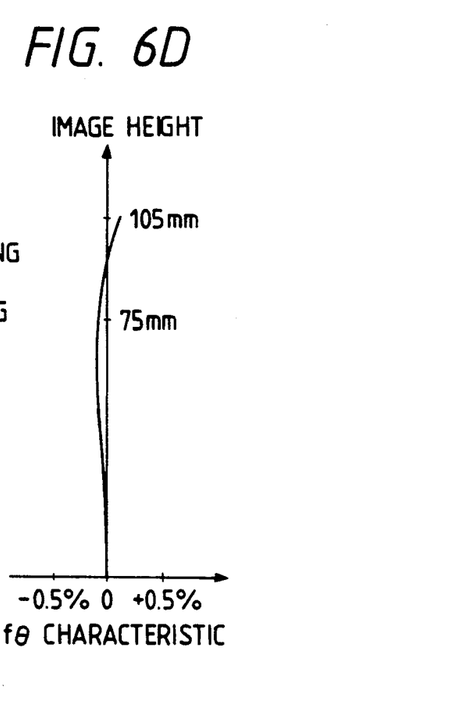
Figure 6E:
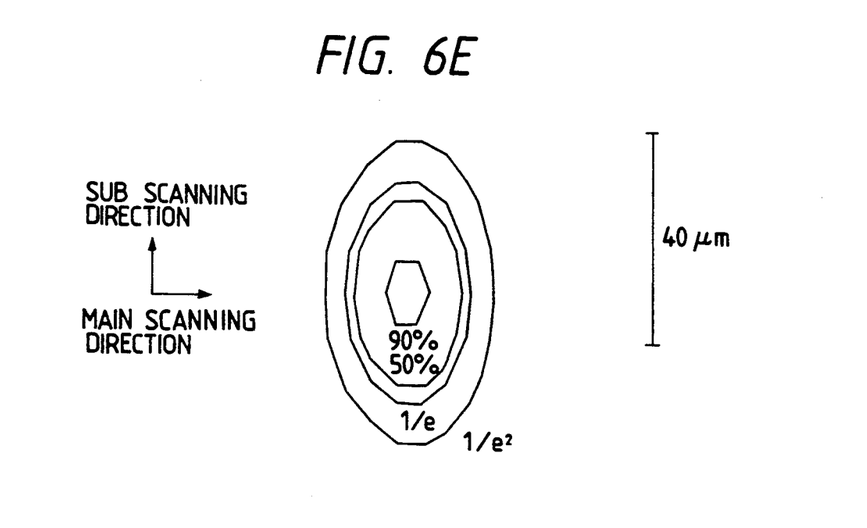

FIGS. 1 and 2 show major portions of an optical system when the laser scanner of the present invention is applied to an image forming apparatus.

FIG. 1 shows a main scan plane which contains a main scan direction of a light deflector 3 which comprises a rotating polygon mirror, and FIG. 2 shows a developed view of the optical system in a sub-scan plane which contains a sub-scan direction which is orthogonal to the main scan direction, and which contains an optical axis of an f−θ lens system.

In FIGS. 1 and 2, numeral 1 denotes a laser light source such as a semiconductor laser, numeral 2 denotes a focusing system which may be a cylindrical lens to linearly focus the laser beam emitted from the laser light source 1 along the sub-scan direction and directs it to one deflection plane 3a of the light deflector 3 which comprises the rotating polygon mirror. Thus, the laser beam which is parallel to the main scan direction and focused along the sub-scan direction is directed to the deflection plane 3a.

Numeral 5 denotes an f−θ lens system which focuses the laser beam reflected and deflected by the deflection plane 3a of the light deflector 3 into a laser spot of a predetermined shape on a scan surface 6 which may be a photoconductor drum. The deflection plane 3a of the light deflector 3 and the scan surface 6 are conjugate in the sub-scan plane by virtue of the f−θ lens system 5.

By rotating the light deflector 3 around a rotation shaft 4 at a constant speed, the laser spot scans the scan surface 6 in the main scan direction at a constant speed. The scan in the sub-scan direction is effected by rotating the photoconductor drum at a constant speed in synchronism with the main scan.

The f−θ lens system in the present embodiment comprises two lenses, a first lens I having a positive refractive power in the main scan plane which is a light beam plane formed by the laser beam deflected with the passage of time by the light deflector, and a second lens II having a positive refractive power in the main scan plane.

A focal length $f_M$ of the f−θ lens system in the main scan plane and a focal length $f_S$ in the sub-scan plane which contains an optical axis of the f−θ lens system and is orthogonal to the main scan plane are selected to be different from each other, and the lenses are arranged such that a distance $D_2$ between the lenses meets a condition of $D_2/f_M \geq 0.1$.

In the present embodiment, the first lens I is a meniscus lens having the positive refractive power and having a convex surface thereof faced the scan surface, and the second lens II is a lens having the positive refractive power and a toric surface in the lens surface facing the scan surface.

In the f−θ lens system of the present embodiment, the plane skew correction of the deflection plane of the light deflector is attained, the laser spot is kept in a proper shape over the entire scan plane including the periphery of the scan plane, and the laser scanner having a good optical performance is attained.

In the present embodiment, in order to attain good light scan while achieving a fine laser spot diameter on the scan surface and the reduction of curvature of the image plane in the scan direction, the lenses in the f−θ lens system are preferably constructed as follows.

(a) A condition of $$0.4 < R1_M/R4_M < 1.5 \quad (1)$$

is to be met, where $R1_M$ is a radius of curvature of the lens surface of the first lens facing the light deflector in the main scan plane, and $R4_M$ is a radius of curvature of the lens surface of the second lens facing the scan surface in the main scan plane.

When an upper limit of the condition formula (1) is exceeded, the constant speed of the laser spot on the main scan plane is not well maintained. When being less than a lower limit the curvature of the image plane in the main scan direction increases.

(b) A condition of $$0.7 < R2_M/R3_S \quad (2)$$

is to be met, where $R2_M$ is a radius of curvature of the lens surface of the first lens facing the scan surface in the main scan plane, and $R3_S$ is a radius of curvature of the lens surface of the second lens facing the light deflector in the sub-scan plane.

When the limit of the condition formula (2) is exceeded, the curvature of the image plane primarily in the sub-scan direction increases.

(c) A condition of $$0.4 < L/f_M \quad (3)$$

is to be met, where L is a distance from the deflection plane of the light deflector to the lens plane of the second lens facing the scan surface.

When the distance L becomes longer beyond the limit of the condition formula (3) in comparison with the focal length $f_M$, the laser spot at the periphery of the scan surface assumes triangular and the image quality in forming the image is deteriorated.

FIGS. 3A, 4A, 5A, 6A show lens sectional views in the main scan plane of the f−θ lens system of the present invention in numerical examples 1 to 4 to be described later, FIGS. 3B, 4B, 5B, 6B show lens sectional views in the sub-scan plane, FIGS. 3C, 4C, 5C, 6C show the curvatures of image plane on the scan surface, FIGS. 3D, 4D, 5D, 6D show f−θ characteristics, and FIGS. 3E, 4E, 5E, 6E show intensity distributions of the laser spot having an image height of 108 mm above the optical axis of the f−θ lens system on the scan surface when the semiconductor laser having a wavelength of 680 nm is used.

In the Examples 1 to 3, the first lens of the f−θ lens system is a positive meniscus lens having a convex surface thereof faced the scan surface, and in the Example 4, it is a meniscus cylindrical lens having a convex surface faced the main scan plane.

In the Examples 1 to 4, the second lens has a cylindrical surface facing the light deflector and a toric surface facing the scan surface.

As shown in FIGS. 3C, 4C, 5C, and FIGS. 3D, 4D, 5D, 6D, the f−θ lens of the present invention well corrects the curvature of image plane on the scan plane and the f−θ characteristic.

As shown in FIGS. 3E, 4E, 5E, 6E, as for the intensity distribution of the laser spot on the scan surface, the spot diameter at the intensity equal to $1/e^2$ of a peak intensity is approximately 40 μm in the main scan direction and 60 μm in the sub-scan direction over the entire scan surface, and the depth of focal point is within ±1 mm, in the Examples 1 to 4. The shape of the laser spot even at the periphery of the scan surface is preferably oval. The numerical examples of the f−θ lens system of the present invention are shown below. In the numerical examples, $Ri_M$ and $Ri_S$ denote the radii of curvature in the main scan plane and the sub-scan plane, of the i-th lens surface as counted from the light deflector, Di denotes a lens thickness of the i-th lens and an air gap, Ni denotes a refractive index of a material of the i-th lens, and $D_0$ denotes a distance from the light deflection plane to the lens surface of the first lens facing the light deflector.

NUMERICAL EXAMPLE 1

$D_0 = 32.7$
$R1_M = -100.8$
$R1_S = -100.8$

-continued

| | | |
|---|---|---|
| $R2_M = -81.7$ | $D_1 = 11.4$ | $N1 = 1.51315$ |
| $R2_S = -81.7$ | | |
| | $D_2 = 22.9$ | |
| $R3_M = \infty$ | | |
| $R3_S = -88.9$ | | |
| | $D_3 = 16.7$ | $N2 = 1.59922$ |
| $R4_M = -131.6$ | | |
| $R4_S = -25.8$ | | |
| $f_M = 168.3$ | Incident image angle $\pm 36.6°$ | |
| Effective F number | Main scan plane: 26.6 | |
| | Sub-scan plane: 38.1 | |

NUMERICAL EXAMPLE 2

| | | |
|---|---|---|
| | $D_0 = 41.6$ | |
| $R1_M = -182.7$ | | |
| $R1_S = -182.7$ | | |
| | $D_1 = 10.5$ | $N1 = 1.59746$ |
| $R2_M = -109.5$ | | |
| $R2_S = -109.5$ | | |
| | $D_2 = 25.4$ | |
| $R3_M = \infty$ | | |
| $R3_S = -84.2$ | | |
| | $D_3 = 23.5$ | $N2 = 1.61882$ |
| $R4_M = -154.8$ | | |
| $R4_S = -28.9$ | | |
| $f_M = 166.1$ | Incident image angle $\pm 36.8°$ | |
| Effective F number | Main scan plane: 26.2 | |
| | Sub-scan plane: 31.8 | |

NUMERICAL EXAMPLE 3

| | | |
|---|---|---|
| | $D_0 = 21.6$ | |
| $R1_M = -77.8$ | | |
| $R1_S = -77.8$ | | |
| | $D_1 = 8.8$ | $N1 = 1.59746$ |
| $R2_M = -68.6$ | | |
| $R2_S = -68.6$ | | |
| | $D_2 = 35.0$ | |
| $R3_M = \infty$ | | |
| $R3_S = -88.1$ | | |
| | $D_3 = 23.7$ | $N2 = 1.61882$ |
| $R4_M = -130.5$ | | |
| $R4_S = -27.4$ | | |
| $f_M = 166.3$ | Incident image angle $\pm 36.8°$ | |
| Effective F number | Main scan plane: 25.9 | |
| | Sub-scan plane: 38.3 | |

NUMERICAL EXAMPLE 4

| | | |
|---|---|---|
| | $D_0 = 29.2$ | |
| $R1_M = -111.7$ | | |
| $R1_S = \infty$ | | |
| | $D_1 = 16.0$ | $N1 = 1.51315$ |
| $R2_M = -90.6$ | | |
| $R2_S = \infty$ | | |
| | $D_2 = 20.6$ | |
| $R3_M = \infty$ | | |
| $R3_S = -80.4$ | | |
| | $D_3 = 22.8$ | $N2 = 1.60312$ |
| $R4_M = -132.7$ | | |
| $R4_S = -25.4$ | | |
| $f_M = 170.3$ | Incident image angle $\pm 36.4°$ | |
| Effective F number | Main scan plane: 26.5 | |
| | Sub-scan plane: 46.0 | |

In accordance with the present invention, the $f-\theta$ lens system comprises two lenses of the predetermined shapes. Thus, the fine laser spot diameter over the entire scan plane and the well correction of the curvature of the image plane are attained with the simple construction and the $f-\theta$ lens which has the deflection plane skew correction function and can scan the light beam with a high optical performance and the laser scanner using the same are provided.

I claim:
1. An $f-\theta$ lens system for directing a light beam deflected by a light deflector to a surface to be scanned for light scanning, comprising:
   a first lens having a lens surface arranged to face the light deflector and having a positive refractive power in the main scan plane; and
   a second lens having a lens surface arranged to face the surface to be scanned and having a positive refractive power in the main scan plane;
   wherein a focal length $f_M$ of the overall $f-\theta$ lens system in the main scan plane and a focal length $f_S$ of the overall $f-\theta$ lens system in the sub-scan plane are different from each other; and
   wherein

$$D_2/f_M \geq 0.1$$

and $$0.4 < R1_M/R4_M < 1.5$$

where $D_2$ is a distance between the first lens and the second lens, $R1_M$ is a radius of curvature of the lens surface of said first lens facing the light deflector in the main scan plane and $R4_M$ is a radius of curvature of the lens surface of said second lens facing the surface to be scanned in the main scan plane.

2. An $f-\theta$ lens system according to claim 1 wherein said second lens has a toric surface.

3. An $f-\theta$ lens system according to claim 1 wherein $$0.7 < R2_M/R3_S$$

where $R2_M$ is a radius of curvature of the lens surface of said first lens facing the surface to be scanned in the main scan plane, and $R3_S$ is a radius of curvature of the lens surface of said second lens facing the light deflector in the sub-scan plane.

4. An $f-\theta$ lens system according to claim 1 wherein said first lens is a meniscus lens having a positive refractive power.

5. A laser scanner comprising:
   a laser light source for emitting a light beam;
   a light deflector for deflecting the light beam emitted from said laser light source;
   a focusing system arranged between said laser light source and said light deflector for linearly focusing the laser beam emitted from said laser light source to a vicinity of a deflection plane of said light deflector; and
   an $f-\theta$ lens system for directing the laser beam deflected by said light deflector to a surface to be scanned;
   said $f-\theta$ lens system including:
   a first lens having a lens surface arranged to face the light deflector and having a positive refractive power in the main scan plane;
   a second lens having a lens surface arranged to face the surface to be scanned and having a positive refractive power in the main scan plane;
   wherein a focal length $f_M$ of the overall $f-\theta$ lens system in the main scan plane and a focal length $f_S$ of the overall f−θ lens system in the sub-scan plane are different from each other; and
wherein $$D_2/f_M \geq 0.1$$

and $$0.4 < R1_M/R4_M < 1.5$$

where $D_2$ is a distance between the first lens and the second lens, $R1_M$ is a radius of curvature of the lens surface of said first lens facing the light deflector in the main scan plane and $R4_M$ is a radius of curvature of the lens surface of said second lens facing the surface to be scanned in the main scan plane.

6. A laser scanner according to claim 5 wherein $$0.4 < L/f_M$$

where L is a distance from the light deflection plane of said light deflector to the lens surface of said second lens facing the surface to be scanned.

7. An image forming apparatus comprising:
a laser light source for emitting a light beam;
a light deflector for deflecting a laser beam emitted from said laser light source;
a focusing system arranged between said laser light source and said light deflector for linearly focusing the laser beam emitted from said laser light source to a vicinity of a deflection plane of said light deflector;
a photosensitive member for receiving the laser beam deflected by said deflector; and
a scanning lens system for directing the laser beam deflected by said light deflector to said photosensitive member;
said scanning lens system including:
a first lens having a lens surface arranged to face the light deflector and having a positive refractive power in a main scan plane; and
a second lens having a lens surface arranged to face the photosensitive member and having a positive refractive power in the main scan plane;
wherein a focal length $f_M$ of the overall scanning lens system in the main scan plane and a focal length $f_S$ of the overall scanning lens system in the sub-scan plane are different from each other; and
wherein $$D_2/f_M \geq 0.1$$

and $$0.4 < R1_M/R4_M < 1.5$$

where $D_2$ is a distance between the first lens and the second lens, $R1_M$ is a radius of curvature of the lens surface of said first lens facing the light deflector in the main scan plane and $R4_M$ is a radius of curvature of the lens surface of said second lens facing the photosensitive member in the main scan plane.

8. A scanning lens system for directing a light beam deflected by a light deflector to a surface to be scanned for light scanning, comprising:
a first lens having a lens surface arranged to face the light deflector and having a positive refractive power in a main scan plane; and
a second lens having a lens surface arranged to face the surface to be scanned and having a positive refractive power in the main scan plane;
wherein a focal length $f_M$ of the overall scanning lens system in the main scan plane and a focal length $f_S$ of the overall scanning lens system in the sub-scan plane are different from each other; and
wherein $$D_2/f_M \geq 1.5$$

where $D_2$ is a distance between the first lens and the second lens, $R1_M$ is a radius of curvature of the lens surface of said first lens facing the light deflector in the main scan plane and $R4_M$ is a raduis of curvature of the lens surface of said second lens facing the surface to be scanned in the main scan plane.

9. A scanning lens system according to claim 8 wherein said second lens has a toric surface.

10. A scanning lens system according to claim 8 wherein $$0.7 < R2_M/R3_S$$

where $R2_M$ is a radius of curvature of the lens surface of said first lens facing the surface to be scanned in the main scan plane, and $R3_S$ is a radius of curvature of the lens surface of said second lens facing the light deflector in the sub-scan plane.

11. A scanning lens system according to claim 8 wherein said first lens is a meniscus lens having a positive refractive power.

12. An f−θ lens system for directing a light beam deflected by a light deflector to a surface to be scanned for light scanning, comprising:
a first lens having a lens surface arranged to face the light deflector and having a positive refractive power in a main scan plane; and
a second lens having a lens surface arranged to face the surface to be scanned and having a positive refractive power in the main scan plane;
wherein a focal length $f_M$ of the overall f−θ lens system in the main plane and a focal length $f_S$ of the overall f−θ lens system in the sub-scan plane are different from each other;
wherein $$D_2/f_M \geq 0.1$$

where $D_2$ is a distance between the first lens and the second lens; and
wherein the lens surface of said first lens facing the light deflector and a lens surface of said first lens facing the surface to be scanned are spherical.

13. An f−θ lens system according to claim 12, wherein $$0.4 < R1_M/R4_M < 1.5$$

where $R1_M$ is a radius of curvature of the lens surface of said first lens facing the light deflector in the main scan plane and $R4_M$ is a radius of curvature of the lens surface of said second lens facing the surface to be scanned in the main scan plane.

14. A laser scanner comprising:
a laser light source for emitting a light beam;
a light deflector for deflecting the light beam emitted from said laser light source;
a focusing system arranged between said laser light source and said light deflector for linearly focusing the laser beam emitted from said laser light source to a vicinity of a deflection plane of said light deflector; and
an $f-\theta$ lens system for directing the laser beam deflected by said light deflector to a surface to be scanned;
said $f-\theta$ lens system including:
a first lens having a lens surface arranged to face the light deflector and having a positive refractive power in a main scan plane; and
a second lens having a lens surface arranged to face the surface to be scanned and having a positive refractive power in the main scan plane;
wherein a focal length $f_M$ of the overall $f-\theta$ lens system in the main scan plane and a focal distance $f_S$ of the overlal $f-\theta$ lens system in the sub-scan plane are different from each other;
wherein $$D_2/f_M \geq 0.1$$

where $D_2$ is a distance between the first lens and the second lens; and
wherein the lens surface of said first lens facing the light deflector and a lens surface of said first lens facing the surface to be scanned are spherical.

15. An $f-\theta$ lens system according to claim 14, wherein $$0.4 < R1_M/R4_M < 1.5$$

where $R1_M$ is a radius of curvature of the lens surface of said first lens facing the light deflector in the main scan plane and $R4_M$ if a radius of curvature of the lens surface of said second lens facing the surface to be scanned in the main scan plane.

16. An image forming apparatus comprising:
a laser light source for emitting a light beam;
a light deflector for deflecting a laser beam emitted from said laser light source;
a focusing system arranged between said laser light source and said light deflector for linearly focusing the laser beam emitted from said laser light source to a vicinity of a deflection plane of said light deflector;
a photosensitive member for receiving the laser beam deflected by said light deflector; and
a scanning lens system for directing the laser beam deflected by said light deflector to said photosensitive member;
said scanning lens system including:
a first lens having a lens surface arranged to face the light deflector and having a positive refractive power in a main scan plane; and
a second lens having a lens surface arranged to face the photosensitive member and having a positive refractive power in the main scan plane;
wherein a focal length $f_M$ of the overall scanning lens system in the main scan plane and a focal length $f_S$ of the overall scanning lens system in the sub-scan plane are different from each other;
wherein $$D_2/f_M \geq 0.1$$

where $D_2$ is a distance between the first lens and the second lens; and
wherein the lens surface of said first lens facing the light deflector and a lens surface of said first lens facing the surface to be scanned are spherical.

17. The image forming apparatus according to claim 16, wherein the scanning lens system satisfies the following condition:

$$0.4 < R1_M/R4_M < 1.5$$

where $R1_M$ is a radius of curvature of the lens surface of said first lens facing the light deflector in the main scan plane and $R4_M$ is a radius of curvature of the lens surface of said second lens facing the photosensitive member in the main scan plane.

18. A scanning lens system for directing a light beam deflected by a light deflector to a surface to be scanned for light scanning, comprising:
a first lens having a lens surface arranged to face the light deflector and having a positive refractive power in a main scan plane; and
a second lens having a lens surface arranged to face the surface to be scanned and having a positive refractive power in the main scan plane;
wherein a focal length $f_M$ of the overall scanning lens system in the main scan plane and a focal length $f_S$ of the overall scanning lens system in the sub-scan plane are different from each other;
wherein $$D_2/f_M \geq 0.1$$

where $D_2$ is a distance between the first lens and the second lens; and
wherein the lens surface of said first lens facing the light deflector and a lens surface of said first lens facing the surface to be scanned are spherical.

19. A scanning system according to claim 18, wherein $$0.4 < R1_M/R4_M < 1.5$$

where $R1_M$ is a radius of curvature of the lens surface of said first lens facing the light deflector int he main scan plane and $R4_M$ is a radius of curvature of the lens surface of said second lens facing the surface to be scanned in the main scan plane.

20. An $f-\theta$ lens system for directing a light beam deflected by a light deflector to a surface to be scanned for light scanning, comprising:
a first lens having a lens surface arranged to face the light deflector and having a positive refractive power in a main scan plane; and
a second lens having a lens surface arranged to face the surface to be scanned and having a positive refractive power in the main scan plane;
wherein a focal length $f_M$ of the overall $f-\theta$ lens system in the main scan plane and a focal length $f_S$ of the overall $f-\theta$ lens system in the sub-scan plane are different from each other;
wherein $$D_2/f_M \geq 0.1$$

where $D_2$ is a distance between the first lens and the second lens;

wherein the lens surface of said first lens facing the light deflector and a lens surface of said first lens facing the surface to be scanned are surfaces whose curvatures in mutually orthogonal directions are different; and
wherein $$0.4 < R1_M/R4_M < 1.5$$

where $R1_M$ is a radius of curvature of the lens surface of said first lens facing the light deflector in the main scan plane and $R4_M$ is a radius of curvature of the lens surface of said second lens facing the surface to be scanned in the main scan plane.

21. A laser scanner comprising:
a laser light source for emitting a light beam;
a light deflector for deflecting the light beam emitted from said laser light source;
a focusing system arranged between said laser light source and said light deflector for linearly focusing the laser beam emitted from said laser light source to a vicinity of a deflection plane of said light deflector; and
an $f-\theta$ lens system for directing the laser beam deflected by said light deflector to a surface to be scanned;
said $f-\theta$ lens system including:
a first lens having a lens surface arranged to face the light deflector and having a positive refractive power in a main scan plane; and
a second lens having a lens surface arranged to face the surface to be scanned and having a positive refractive power in the main scan plane;
wherein a focal length $f_M$ of the overall $f-\theta$ lens system in the main scan plane and a focal distance $f_S$ of the overall $f-\theta$ lens system in the sub-scan plane are different from each other;
wherein $$D_2/f_M \geq 0.1$$

where $D_2$ is a distance between the first lens and the second lens;
wherein the lens surface of said first lens facing the light deflector and a lens surface of said first lens facing the surface to be scanned are surfaces whose curvatures in mutually orthogonal directions are different; and
wherein $$0.4 < R1_M/R4_M < 1.5$$

where $R1_M$ is a radius of curvature of the lens surface of said first lens facing the light deflector in the main scan plane and $R4_M$ is a radius of curvature of the lens surface of said second lens facing the surface to be scanned in the main scan plane.

22. An image forming apparatus comprising:
a laser light source for emitting a light beam;
a light deflector for deflecting a laser beam emitted from said laser light source;
a focusing system arranged between said laser light source and said light deflector for linearly focusing the laser beam emitted from said laser light source to a vicinity of a deflection plane of said light deflector;
a photosensitive member for receiving the laser beam deflected by said light deflector; and a scanning lens system for directing the laser beam deflected by said light deflector to said photosensitive member;
said scanning lens system including:
a first lens having a lens surface arranged to face the light deflector and having a positive refractive power in a main scan plane; and
a second lens having a lens surface arranged to face the photosensitive member and having a positive refractive power in the main scan plane;
wherein a focal length $f_M$ of the overall scanning lens system in the main scan plane and a focal length $f_S$ of the overall scanning lens system in the sub-scan plane are different from each other;
wherein $$D_2/f_M \geq 0.1$$

where $D_2$ is a distance between the first lens and the second lens;
wherein the lens surface of said first lens facing the light deflector and a lens surface of said first lens facing the photosensitive member are surfaces whose curvatures in mutually orthogonal directions are different; and
wherein $$0.4 < R1_M/R4_M < 1.5$$

where $R1_M$ is a radius of curvature of the lens surface of said first lens facing the light deflector in the main scan plane and $R4_M$ is a radius of curvature of the lens surface of said second lens facing the photosensitive member in the main scan plane.

23. A scanning lens system for directing a light beam deflected by a light deflector to a surface to be scanned for light scanning, comprising:
a first lens having a lens surface arranged to face the light deflector and having a positive refractive power in a main scan plane; and
a second lens having a lens surface arranged to face the surface to be scanned and having a positive refractive power in the main scan plane;
wherein a focal length $f_M$ of the overall scanning lens system in the main scan plane and a focal length $f_S$ of the overall scanning lens system in the sub-scan plane are different from each other;
wherein $$D_2/f_M \geq 0.1$$

where $D_2$ is a distance between the first lens and the second lens;
wherein the lens surface of said first lens facing the light deflector and a lens surface of said first lens facing the surface to be scanned are surfaces whose curvatures in mutually orthogonal directions are different; and
wherein $$0.4 < R1_M/R4_M < 1.5$$

where $R1_M$ is a radius of curvature of the lens surface of said first lens facing the light deflector in the main scan plane and $R4_M$ is a radius of curvature of the lens surface of said second lens facing the surface to be scanned in the main scan plane.

24. An f−θ lens system for directing a light beam deflected by a light deflector to a surface to be scanned for light scanning, comprising:
- a first lens having a lens surface arranged to face the light deflector and having a positive refractive power in a main scan plane; and
- a second lens having a lens surface arranged to face the surface to be scanned and having a positive refractive power in the main scan plane;
- wherein a focal length $f_M$ of the overall f−θ lens system in the main scan plane and a focal length $f_S$ of the overall f−θ lens system in the sub-scan plane are different from each other;
- wherein $$D_2/f_M \geq 0.1$$

where $D_2$ is a distance between the first lens and the second lens;
- wherein a lens surface of said second lens facing the light deflector and the lens surface of said second lens facing the surface to be scanned are surfaces whose curvatures in mutually orthogonal directions are different; and
- wherein $$0.4 < R1_M/R4_M < 1.5$$

where $R1_M$ is a radius of curvature of the lens surface of said first lens facing the light deflector in the main scan plane and $R4_M$ is a radius of curvature of the lens surface of said second lens facing the surface to be scanned in the main scan plane.

25. A laser scanner comprising:
- a laser light source for emitting a light beam;
- a light deflector for deflecting the light beam emitted from said laser light source;
- a focusing system arranged between said laser light source and said light deflector for linearly focusing the laser beam emitted from said laser light source to a vicinity of a deflection plane of said light deflector; and
- an f−θ lens system for directing the laser beam deflected by said light deflector to a surface to be scanned;
- said f−θ lens system including:
- a first lens having a lens surface arranged to face the light deflector and having a positive refractive power in a main scan plane; and
- a second lens having a lens surface arranged to face the surface to be scanned and having a positive refractive power in the main scan plane;
- wherein a focal length $f_M$ of the overall f−θ lens system in the main scan plane and a focal distance $f_S$ of the overall f−θ lens system in the sub-scan plane are different from each other;
- wherein $$D_2/f_M \geq 0.1$$

where $D_2$ is a distance between the first lens and the second lens;
- wherein a lens surface of said second lens facing the light deflector and the lens surface of said second lens facing the surface to be scanned are surfaces whose curvatures in mutually orthogonal directions are different; and
- wherein $$0.4 < R1_M/R4_M < 1.5$$

where $R1_M$ is a radius of curvature of the lens surface of said first lens facing the light deflector in the main scan plane and $R4_M$ is a radius of curvature of the lens surface of said second lens facing the surface to be scanned in the main scan plane.

26. An image forming apparatus comprising:
- a laser light source for emitting a light beam;
- a light deflector for deflecting a laser beam emitted from said laser light source;
- a focusing system arranged between said laser light source and said light deflector for linearly focusing the laser beam emitted from said laser light source to a vicinity of a deflection plane of said light deflector;
- a photosensitive member for receiving the laser beam deflected by said light deflector; and
- a scanning lens system for directing the laser beam deflected by said light deflector to said photosensitive member;
- said scanning lens system including:
- a first lens having a lens surface arranged to face the light deflector and having a positive refractive power in a main scan plane; and
- a second lens having a lens surface arranged to face the photosensitive member and having a positive refractive power in the main scan plane;
- wherein a focal length $f_M$ of the overall scanning lens system in the main scan plane and a focal length $f_S$ of the overall scanning lens system in the sub-scan plane are different from each other;
- wherein $$D_2/f_M \geq 0.1$$

where $D_2$ is a distance between the first lens and the second lens;
- wherein a lens surface of said second lens facing the light deflector and the lens surface of said second lens facing the photosensitive member are surfaces whose curvatures in mutually orthogonal directions are different; and
- wherein $$0.4 < R1_M/R4_M < 1.5$$

where $R1_M$ is a radius of curvature of the lens surface of said first lens facing the light deflector in the main scan plane and $R4_M$ is a radius of curvature of the lens surface of said second lens facing the photosensitive member in the main scan plane.

27. A scanning lens system for directing a light beam deflected by a light deflector to a surface to be scanned for light scanning, comprising:
- a first lens having a lens surface arranged to face the light deflector and having a positive refractive power in a main scan plane; and
- a second lens having a lens surface arranged to face the surface to be scanned and having a positive refractive power in the main scan plane;
- wherein a focal length $f_M$ of the overall scanning lens system in the main scan plane and a focal length $f_S$ of the overall scanning lens system i the sub-scan plane are different from each other;
- wherein $$D_2/f_M \geq 0.1$$

where $D_2$ is a distance between the first lens and the second lens; and wherein a lens surface of said second lens facing the light deflector and the lens surface of said second lens facing the surface to be scanned are surfaces whose curvatures in mutually orthogonal directions are different; and wherein $$0.4 < R1_M/R4_M < 1.5$$

where $R1_M$ is a radius of curvature of the lens surface of said first lens facing the light deflector in the main scan plane and $R4_M$ if a radius of curvature of the lens surface of said second lens facing the surface to be scanned in the main scan plane.

* * * * *

UNITED STATES PATENT AND TRADEMARK OFFICE
CERTIFICATE OF CORRECTION

PATENT NO. : 5,153,767

DATED : October 6, 1992

INVENTOR(S) : Jun Makino

It is certified that error appears in the above-identified patent and that said Letters Patent is hereby corrected as shown below:

Column 2, line 36, change "D/hd $2/f_M \geq 0.1$" to --$D_2/f_M \geq 0.1$--.

Column 4, line 51, "The shape of the laser ..." should begin a new paragraph; and
line 53, "The numerical examples ..." should begin a new paragraph.

Claim 8, column 8, line 13, "$D_2/f_M \geq 1.5$" should read --$D_2/f_M \geq 0.1$ and $0.4 < R1_M/R4_M < 1.5$--

Claim 14, column 9, line 22, change "overlal" to --overall--.

Claim 19, column 10, line 46, change "int he" to --in the--.

Claim 27, column 14, line 65, change "system i" to --system in--; and

UNITED STATES PATENT AND TRADEMARK OFFICE
CERTIFICATE OF CORRECTION

PATENT NO. : 5,153,767

DATED : October 6, 1992

INVENTOR(S) : Jun Makino

It is certified that error appears in the above-identified patent and that said Letters Patent is hereby corrected as shown below:

Column 16, line 7, change "if" to --is--.

Signed and Sealed this

Twenty-first Day of December, 1993

Attest:

BRUCE LEHMAN

Attesting Officer     Commissioner of Patents and Trademarks